United States Patent [19]

Bubenik et al.

[11] Patent Number: 4,734,643

[45] Date of Patent: Mar. 29, 1988

[54] METHOD AND APPARATUS FOR DETECTING THE PRESENCE OF MAGNETIC INK WITHIN A PACKAGE BY MAGNETIZING AND SELECTIVELY REMAGNITIZING THE FERRO-MAGNETIC MATERIALS IN THE PACKAGE

[75] Inventors: David M. Bubenik; Gerald August, both of Palo Alto; Richard K. Niles, Berkeley, all of Calif.; James M. Pippin, Fort Worth, Tex.

[73] Assignee: ElectroCom Automation, Inc., Arlington, Tex.

[21] Appl. No.: 762,711

[22] Filed: Aug. 5, 1985

[51] Int. Cl.[4] .................. G01N 27/72; G01R 33/12; B07C 5/344; G06K 7/08

[52] U.S. Cl. ................................. 324/232; 324/226; 209/567; 235/449

[58] Field of Search ............... 324/228, 232, 239, 243, 324/210–212, 226; 340/551, 568; 209/567, 569; 235/449, 493

[56] References Cited

U.S. PATENT DOCUMENTS

| | | | |
|---|---|---|---|
| 3,577,203 | 5/1971 | Beach | 235/61.11 |
| 3,654,435 | 4/1972 | Vaccaro | 235/61.12 |
| 3,697,972 | 10/1972 | Brown | 324/232 |
| 3,818,446 | 6/1974 | Benson | 340/146.3 |
| 3,863,219 | 1/1975 | Rohrer | 340/146.3 |
| 3,895,220 | 7/1975 | Nelson et al. | 235/61.12 |
| 3,978,450 | 8/1976 | Sanner et al. | 340/146.3 |
| 4,012,690 | 3/1977 | Heztow | 324/243 |
| 4,038,596 | 7/1977 | Lee | 324/210 |
| 4,053,737 | 10/1977 | Lafevers et al. | 235/61.11 |
| 4,087,789 | 5/1978 | Beery | 340/146.3 |
| 4,148,010 | 4/1979 | Shiau | 340/146.3 |
| 4,218,612 | 8/1980 | Krehl et al. | 235/449 |
| 4,283,708 | 8/1981 | Lee | 340/146.3 |
| 4,399,553 | 8/1983 | Toyama | 382/7 |

Primary Examiner—Reinhard J. Eisenzopf
Assistant Examiner—Walter E. Snow
Attorney, Agent, or Firm—Vaden, Eickenroht, Thompson & Boulware

[57] ABSTRACT

A method and apparatus for detecting the presence of magnetic ink within a package without opening the package or altering its contents. The method and apparatus detects items marked with magnetic ink, such as bank checks, in an unopened package independently of the item's location within the package and despite the presence of such magnetic clutter as staples and paper clips. The apparatus and method is designed to eliminate magnetic noise from the equipment itself and from the environment.

8 Claims, 7 Drawing Figures

METHOD AND APPARATUS FOR DETECTING THE PRESENCE OF MAGNETIC INK WITHIN A PACKAGE BY MAGNETIZING AND SELECTIVELY REMAGNITIZING THE FERRO-MAGNETIC MATERIALS IN THE PACKAGE

This invention relates to an apparatus and method for detecting the presence of magnetic ink within a package. More particularly, this invention relates to an apparatus and method for the detection of bank checks within unopened mailpieces.

BACKGROUND OF THE INVENTION

It is desirable to upgrade existing package sorting equipment to add the capability of detecting, without opening the package or altering its contents, the presence of items marked with magnetic ink. It is particularly desirable for an addressee to give incoming check payments priority attention. Financial institutions, or other organizations and government agencies, can enhance interest accumulation by assigning priority attention to the processing of account payments. Nearly all bank checks currently in use are printed with magnetic ink. Manufacturing standards for such checks are specified by ANSI standards X3.2-1970 and X3.3-1970. Standards for the magnetic ink are given in the American Banking Association MICR specification.

Equipment exists for reading magnetically marked items upon orderly presenting. The object of the present invention is to detect such magnetically marked items in an unopened package independently of their location within the package and of any neighboring clutter, such as staples or paper clips.

Therefore, it is a feature of the present invention to sort unopened packages in an improved manner according to whether or not they contain magnetic ink.

It is a further feature of the present invention to detect the presence of magnetic ink in unopened packages in an improved manner wherein the positioning of the item bearing magnetic ink within the package and the depth relationship of that item to the face of the package is variable.

It is another feature of the present invention to provide a means for detecting the presence of magnetic ink within an unopened package despite the presence of other ferromagnetic items (clutter) also arbitrarily oriented and distributed within the package.

It is another feature of the present invention to provide a means for detecting the presence of magnetic ink within an unopened package where the means for transporting the package does not generate magnetic noise that destroys the accuracy of the data.

SUMMARY OF THE INVENTION

The apparatus and method for detecting the presence of magnetic ink within a package involves selectively magnetizing the ferromagnetic materials within the package. Selective magnetization utilizes the fact that magnetic ink and other ferromagnetic material (clutter) within the package offer a variety of characteristics affecting magnetization, such as remnance, coercivity, permeability, bulk, physical configuration and physical orientation. A detector generates signals responding to the magnetic moments within the package and not responding to the transport means for the package. Signals from the detector are processed, compared to standards and a determination is made of whether magnetic ink is present.

BRIEF DESCRIPTION OF THE DRAWINGS

So that the manner in which the above recited features, advantages and objects of the invention as well as others which will become apparent, are attained and can be understood in detail, more detailed description of the invention briefly summarized above may be had by reference to the embodiment thereof which is illustrated in the drawings, which drawings form a part of this specification. It is to be noted, however, that the appended drawings illustrate only a typical embodiment of the invention and are therefore not to be considered limiting of its scope as the invention may admit to other equally effective embodiments.

DESCRIPTION OF THE PREFERRED EMBODIMENT

In the description of the preferred embodiment that follows, the package is referred to as a mailpiece. Detecting the presence of magnetic ink within unopened mailpieces is an obvious use although not the sole use for the present invention.

Figure 1:
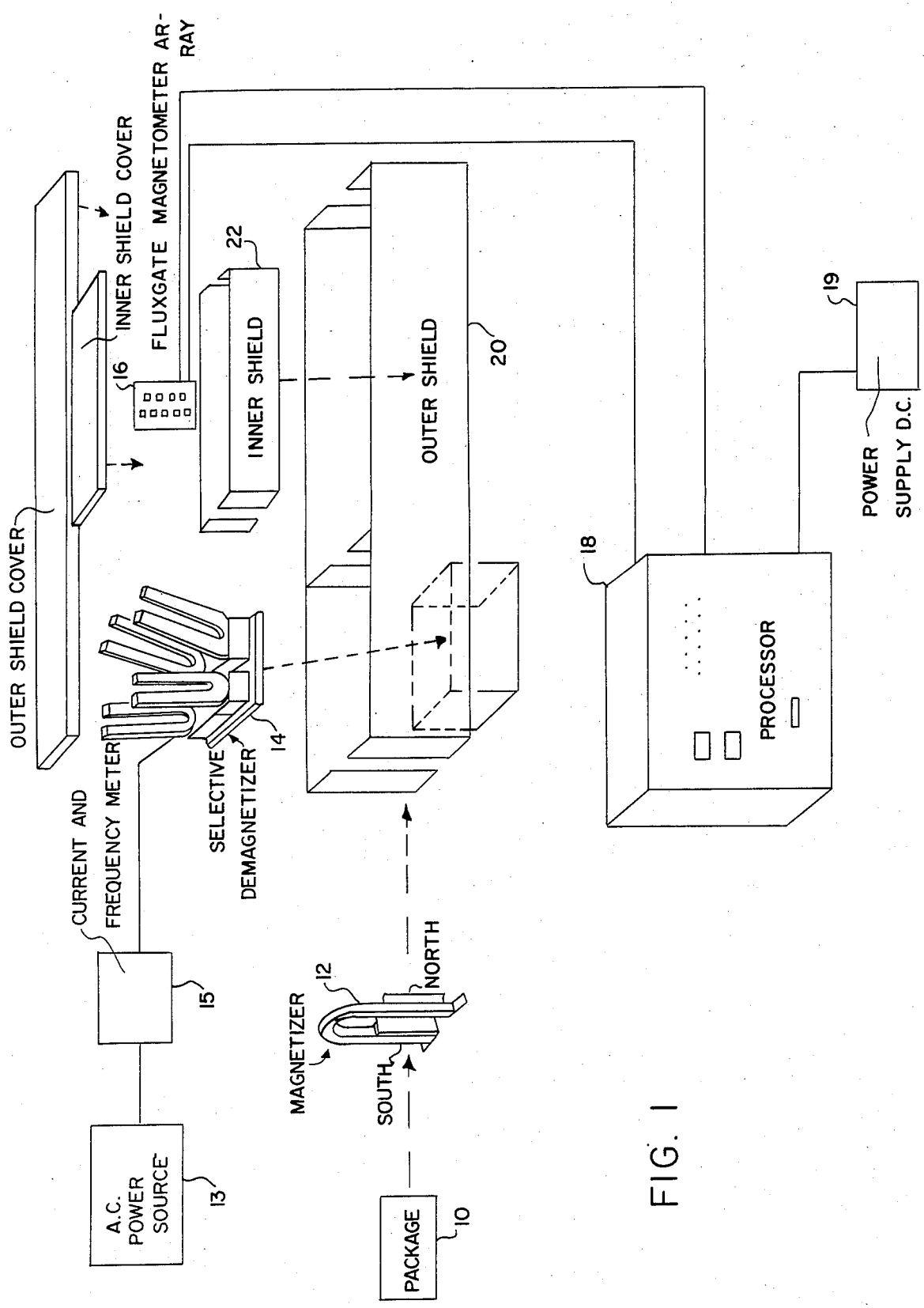
FIG. 1 is a schematic diagram illustrating a preferred embodiment of the detection system, the methods and the components of the apparatus.

FIG. 1 illustrates a package sorting system designed to accommodate mailpieces with certain dimensions assumed. Mailpiece 10 is moved rapidly past magnetizer 12 and selective demagnetizer 14 which resides within outer shield 20. Magnetizer 12 and selective demagnetizer 14 collectively perform the magnetizing means function in the preferred embodiment in two steps. The mailpiece then moves through inner shield 22 and past fluxgate magnetometers 16. Upon exiting outer shield 20, electronic assembly processor 18 will have determined whether or not magnetic ink is present within the mailpiece. The mailpiece will be sorted accordingly.

Selective demagnetizer 14 is operated by alternating current power source 13, monitored in turn by current and frequency meter 15. Direct current power source 19 supplies current for electronic processor assembly 18. It can be noted that the system is designed to move the mailpiece through the magnetizing, the detecting and processing areas in a vertical position.

Figure 2:
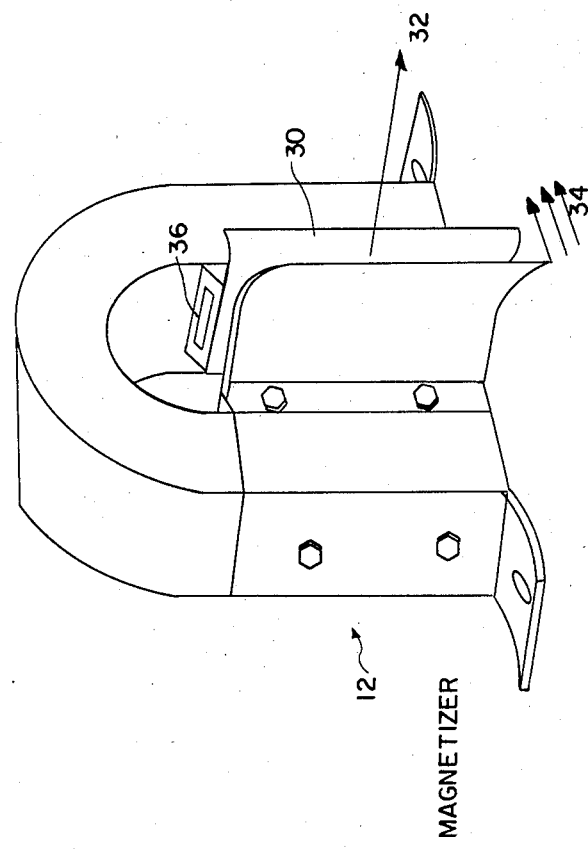
FIG. 2 is an embodiment of the source of the first magnetic field of the magnetizing means, a permanent magnet.

FIG. 2 is an embodiment of the first part of the magnetizing means, permanent magnet 12. The mailpiece passes through passageway 30 in direction of arrow 32. Two vertical stacks of ceramic magnets 36 one each side of passageway 30 produce a magnetic field of several kilogauss crossing the path of the mailpiece in the direction of arrows 34. The direction of the magnetic field vectors created by permanent magnet 12 is perpendicular to the path of the mailpiece and normal to the general vertical plane of the mailpiece. The resultant magnetic moment vectors created in the ferromagnetic material contained within the mailpiece should be predominantly aligned in the same direction as the magnetic field vectors of permanent magnet 12.

Figure 3A:
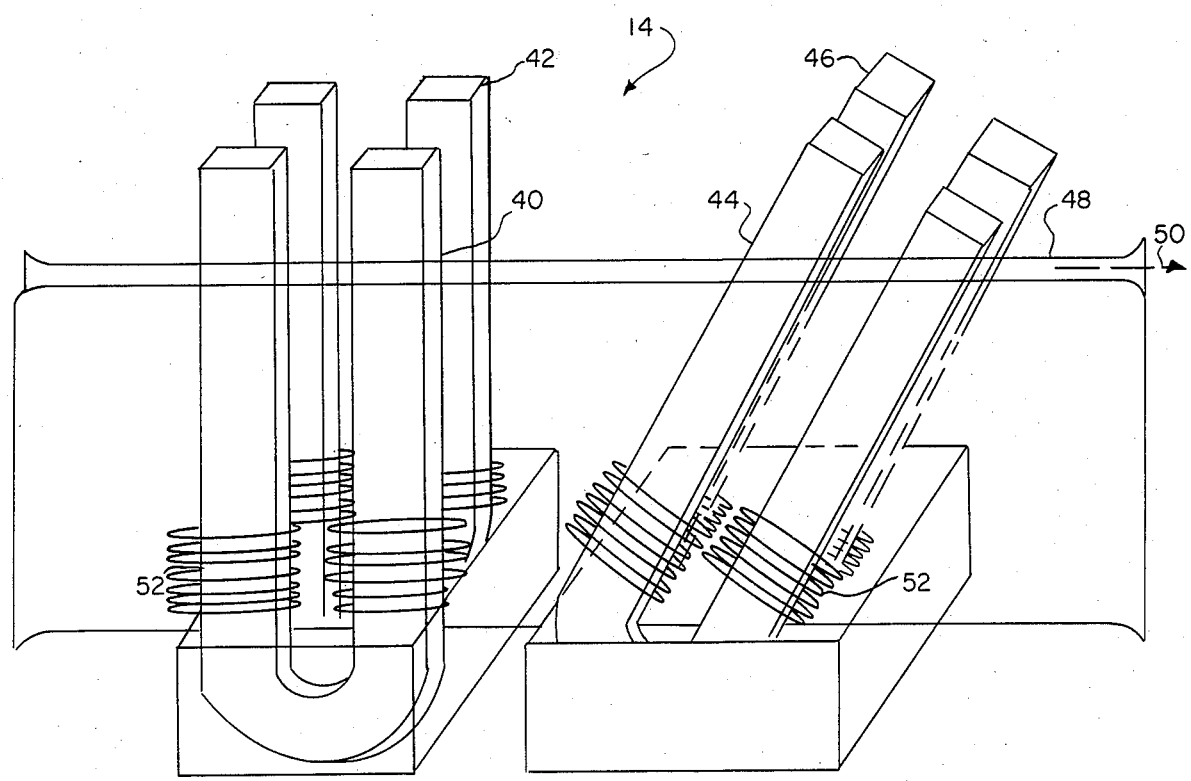
FIGS. 3A and 3B illustrate an embodiment of the source of the second magnetic field of the magnetizing means, the electromagnets.
Figure 3B:
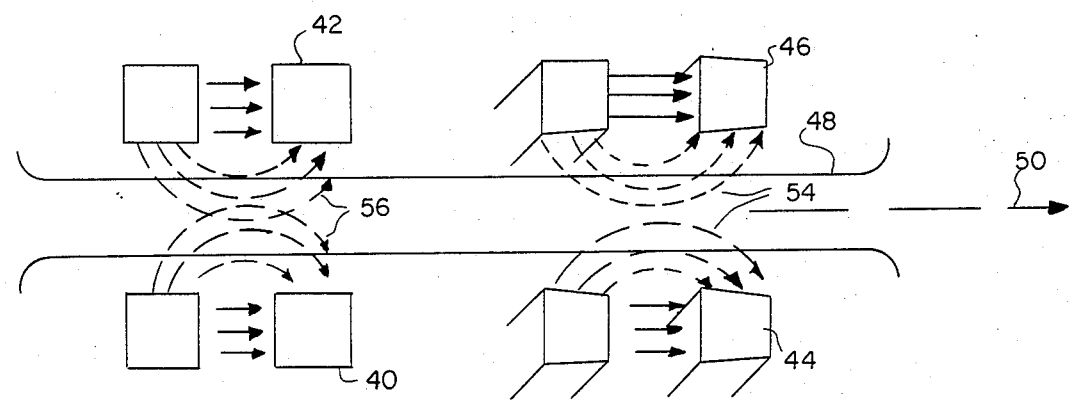

FIGS. 3A and 3B illustrate the second part of the magnetizing means, electromagnets 40, 42, 44 and 46. These electromagnets comprise selective demagnetizer 14. As can be seen in FIG. 1, the selective demagnetizer resides within outer shield 20.

Selective demagnetizer 14 consists of four electromagnets. Each electromagnet consists of a suitable core formed into a horseshoe configuration. Induction coils 52 are wound around the base of each electromagnet 40, 42, 44 and 46. As illustrated in FIG. 1 alternating current power supply 13 supplies current, as metered by meter 15, to the induction coils. The magnetic fields created by the four electromagnets alternate at a high frequency. Mailpiece 10 passes through mail guide 48 in the direction of arrow 50. Electromagnets 44 and 46 are tilted at an angle of 30 degrees from the vertical and from the axis of electromagnets 40 and 42. The magnetic field vectors created by the electromagnets within mail guide 48 assume the directions shown by arrows 54 and 56. Arrows 54 and 56 lie essentially within the plane of the mailpiece passing through mail guide 48. Arrows 56 are essentially horizontal or in the direction of the path of the mailpiece. Arrows 54 are tilted down making an approximate 30 degree angle with the horizontal. Magnetic field vectors corresponding to arrows 54 will yield a field vector component in the horizontal direction and a field vector component in the vertical direction. The alternating magnetic fields caused by the alternating current cycles ferromagnetic materials within the field of the electromagnets through a sequence of complete hysteresis loops. ABA standard specifies a minimum MICR ink coercivity of 250 Oe. Typical coercivity for the soft steel comprising staples, paper clips and other likely ferromagnetic clutter is less than 50 Oe. As a result, an alternating magnetic field can be selected that will cycle the ferromagnetic steel clutter in a package through a sequence of complete hysteresis loops but will cycle the MICR ink through only minor loops, leaving intact most of the magnetic moment vectors of the MICR ink.

Moreover, to the extent that staples, paper clips and other ferromagnetic clutter within the package tend to have an elongated shape, such materials will have a tendency to magnetize to a greater extent in the direction where their magnetic moment vectors are aligned parallel with their enlongated shape. Hence, the geometry of such material affects their remnant magnetization.

An important part of the selective demagnetization process is that the amplitude of the hysteresis loops diminishes as the package exits the selective demagnetization apparatus. This is achieved by exploiting the decay of the magnetic field with distance from the poles of the demagnetizing electromagnets, rather than by the more common means of amplitude modulation of the demagnetizing field via amplitude modulation of the alternating current to the demagnetizing electromagnets. For adequate efficiency of the selective demagnetization process, after leaving the pole pieces of the demagnetizing magnets, the package must undergo at least five progressively smaller hysteresis loop cycles prior to entering the inner magnetic shield containing the fluxgate magnetometer apparatus.

The net effect in the preferred embodiment of moving the mailpieces through the mail guide past demagnetizers 40, 42, 44, and 46 is to only slightly demagnetize in a direction normal to the plane of movement of the mailpiece, the magnetic ink with its relatively high coercivity and flat geometry. Other soft ferromagnetic materials with a lower coercivity are demagnetized and their magnetic moment vectors are reoriented to lie within the plane of the mailpiece. To the extent that the clutter consists of soft ferromagnetic material with an enlongated shape lying within the anticipated plane of the mailpiece, the reorienting of the vectors is enhanced.

Figure 4:
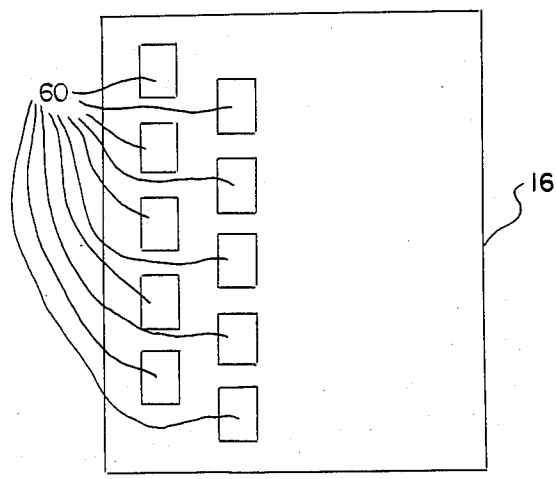
FIG. 4 illustrates the preferred embodiment for the detector system.

FIG. 4 illustrates a particular arrangement of a detector system. Board 16 contains ten fluxgate magnetometers 60 arranged in two columns with a slight offset. Magnetic field vectors orginating in a mailpiece passing in front of detector board 16, to the extent they are directed normal to the plane of the mailpiece, will be picked up by one of the fluxgate magnetometers. It can be seen from FIG. 1 that the fluxgate magnetometers on detector board 16 are placed both within inner shield 22 and outer shield 20. One fluxgate magnetometer may be placed at a height such that it is always higher than the highest package or mailpiece. The reading of this fluxgate magnetometer may be used to determine the noise in the system at any given sampling time. Since the fluxgate magnetometers are, in the preferred embodiment, placed in two staggered columns, their output will have to be time-justified.

Figure 5:
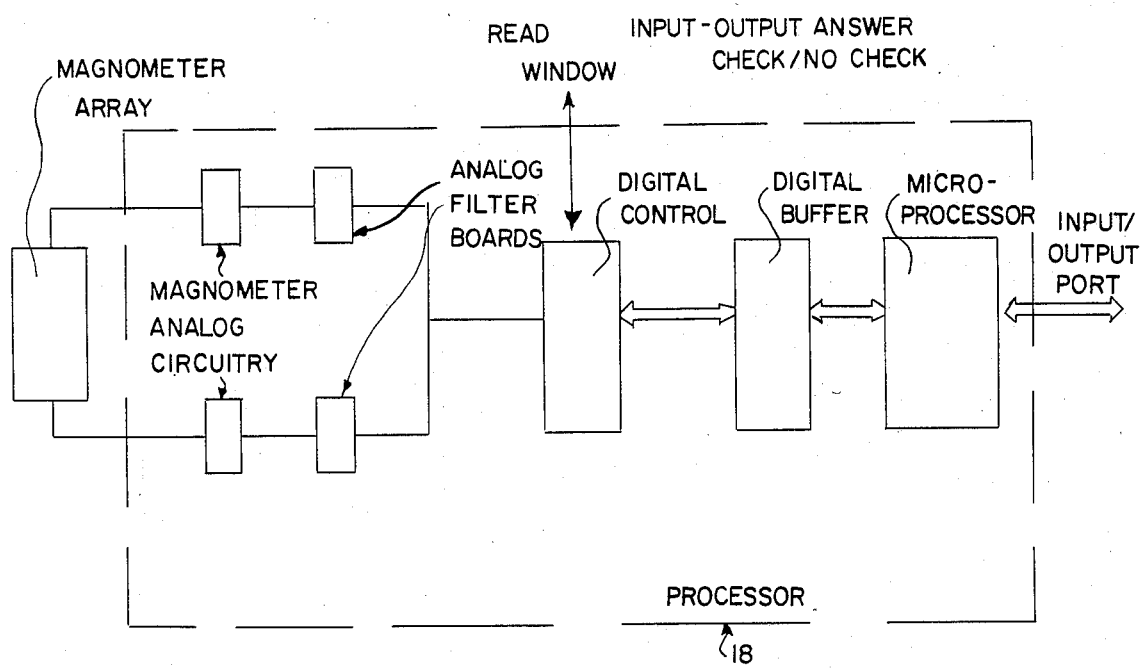
FIG. 5 is a block diagram of the processing unit.

The output of the fluxgate magnetometers from the detector board 16 is fed into processor unit 18 as depicted schematically in FIG. 5. The analog signals are filtered, amplified, multiplexed and converted into digital data. The data is sampled in a time frame that corresponds to some certain portion of a package per unit of time. Given the strength and the orientation of the magnetizer and the demagnetizer, magnetic ink present within the package will be evident by a signature within a given intensity range. Ferromagnetic clutter, due to its different geometry, size and coercivity, will exhibit different signatures as a result of the magnetizing and demagnetizing process. This signature may be of an intensity higher or lower than the magnetic ink. Processor 18 times justified and scans the digitized data looking for the characteristic signature of magnetic ink. When the magnetic ink signature is detected an output signal alerts a subsequent sorter.

Figure 6:
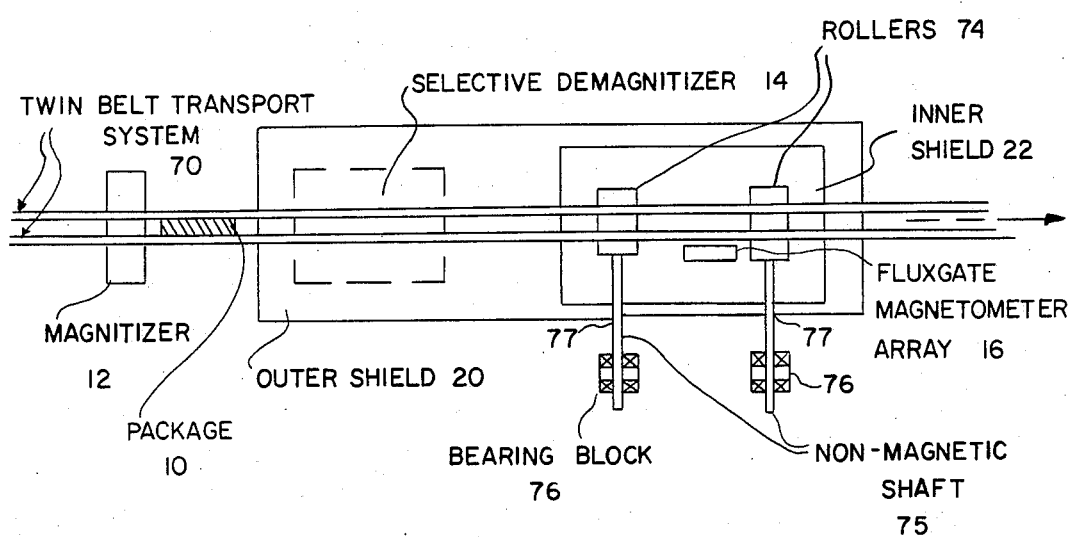
FIG. 6 is an overhead view of the magnetic shields and transport means.

FIG. 6 illustrates the inner and outer magnetic shield housing for demagnetizer 14 and fluxgate magnetometer array 16. In the preferred embodiment this shield is a mumetal shield. This shield attenuates the ambient magnetic noise from the electromechanical machine and transport environment. Additionally, the shield reduces the geomagnetic field intensity in the magnetometer vicinity. The shield is comprised of outer shield 20 encompassing demagnetizer 14 and detector 16 and additional inner shield 22 encompassing only detector 16.

FIG. 6 also illustrates the preferred package transport scheme through the magnetic shield housing. Package 10 is transported through the magnetic shield housings 20 and 22 by a twin-belt system 70. Routing and closure of the twin belts within the magnetic shield housings is accomplished by rollers 74 constructed of a non-magnetic material to prevent magnetic noise contamination. The rotational motion of the rollers is transmitted by a non-magnetic shaft 75 through opening 77 in each of the inner and outer shields to a remote bearing block assembly 76. The above described scheme mounts the bearings external to the inner and outer shields. This arrangement utilizes the shielding effects of the mumetal housings to attenuate the magnetic noise produced by the bearings. Although the roller and shaft scheme is illustrated as connecting with the inner and outer shields from their side, the roller and shaft scheme may also connect with the inner and outer shields from above or below.

The present invention easily integrates into a mail processing and sorting machine. These machines transport mailpieces rapidly, approximately 170 inches per second, and as a function of an output from the magnetic ink detector a host computer can classify and sort the mail into appropriate bins.

The present invention also includes a data buffer in the processor unit that permits a dump of the time justified digitized data sampled during each scan of the package by the detectors, along with the ultimate determination of whether or not magnetic ink was present. This data field dump presents a numerical image of the magnetic signatures sensed by the magnetometers and provides a useful function as a system performance diagnostic tool.

Alternate configurations of this invention may be arranged. The magnetizing means need not be separated into two parts, an initial magnetization and a subsequent selective demagnetization. One complex magnetizing field would be sufficient. Arrangements of multiple magnetic sensing devices, perhaps similar to magnetic tape heads, might be utilized as detecting devices. Changes in the magnetizing and the detecting means would result in different detected signatures. The processor must in turn be programmed to recognize the anticipated signatures of the magnetic ink and the other clutter.

While a particular embodiment of the invention has been shown and described, it will be understood that the invention is not limited thereto since many modifications may be made and will be apparent to those skilled in the art.

What is claimed is:

1. An apparatus for detecting the presence of magnetic ink within a package, comprising:
   magnetizing means that produces a magnetic field passing through the package such that enclosed ferro-magnetic materials are magnetized and selectively remagnetized to generate resultant magnetic moment vectors that are a function of the field as well as the magnetic characteristics of the enclosed materials, said magnetizing means further comprising
   a first magnetic field that magnetizes the ferro-magnetic materials within the package such that their magnetic moment vectors are aligned in a first direction that is normal to a plane that is anticipated to contain magnetic ink; and
   a second magnetic field that remagnetizes by reducing and aligning, in a second or more directions, the magnetic moment vectors of magnetically soft ferro-magnetic materials, where at least one such second direction of alignment is chosen to lie within a plane anticipated to contain magnetic ink;
   a detector that generates signals responsive to the magnetic moment vectors within the package; and
   a processor that receives the signals, compares at least one characteristic of the signals to at least one standard, and determines whether magnetic ink is present within the package.

2. The apparatus of claim 1, wherein the first magnetic field is generated by a permanent magnet.

3. The apparatus of claim 1, wherein the second magnetic field is generated by an electromagnet driven by an AC power source.

4. The apparatus of claim 1, wherein the second magnetic field is generated by two electromagnets, both of whose magnetic field vectors, when they intersect a plane anticipated to contain magnetic ink, essentially lie in that plane, and each of whose magnetic field vectors intersect each other in such a plane at an angle such that one field's vectors product a vector component normal to the direction of the other field's vectors.

5. The apparatus of claim 1, wherein the processor comprises:
   means for processing signals from the detector which comprises sequentially filtering, amplifying, and multiplexing said signals;
   means for digitizing and time justifying the processed signals;
   means for buffering the digitized signals;
   means for generating data by applying algorithms to the buffered digitized signals, and
   means for comparing the generated data with pre-established standards to determine if magnetic ink is present within the package.

6. The apparatus of claim 5, which further comprises:
   means for outputting the buffered digitized signals or the results of said comparison so that system performance can be evaluated.

7. A method for detecting the presence of magnetic ink within a package which comprises:
   magnetizing all ferro-magnetic materials enclosed within the package such that the magnetic moment vectors are aligned in a first direction normal to an anticipated plane containing magnetic ink within the package,
   remagnetizing the magnetically soft ferro-magnetic materials within the package by reducing and aligning in a second or more direction, the magnetic moment vectors of the magnetically soft ferro-magnetic materials, one of which directions lies within a plane anticipated to contain magnetic ink,
   generating signals responsive to the resultant magnetic moment vectors of materials within the package, and
   comparing at least one characteristic of the generated signals to at least one standard to determine whether magnetic ink is present within the package.

8. The method of claim 7, wherein the comparing comprises:
   filtering, amplifying and multiplexing the generated signals,
   applying algorithms to the data, and
   making comparisons with a pre-established standard to determine if magnetic ink is present within the package.

* * * * *

UNITED STATES PATENT AND TRADEMARK OFFICE
CERTIFICATE OF CORRECTION

PATENT NO. : 4,734,643

DATED : March 29, 1988

INVENTOR(S) : David M. Bubenick et al

It is certified that error appears in the above-identified patent and that said Letters Patent are hereby corrected as shown below:

```
FIG. 1 - change the word "DEMAGNETIZER" to "REMAGNETIZER"
FIG. 6 - change the word "DEMAGNETIZER" to "REMAGNETIZER"
Col. 1, line 31 - change "presenting" to "presentation"
Col. 2, line 42 - change "demagnetizer" to "remagnetizer"
Col. 2, lines 43-44 - change "demagnetizer" to "remagnetizer"
Col. 2, line 51 - change "demagnetizer" to "remagnetizer"
Col. 3, line 6 - change "demagnetizer" to "remagnetizer"
Col. 3, line 7 - change "demagnetizer" to "remagnetizer"
Col. 3, line 9 - change "demagnetizer" to "remagnetizer"
Col. 3, line 51 - change "demagnetization" to "remagnetization"
Col. 3, lines 53-54 - change "demagnetization" to "remagnetization"
Col. 3, line 56 - change "demagnetizing" to "remagnetizing"
Col. 3, line 58 - change "demagnetizing" to "remagnetizing"
Col. 3, line 59 - change "demagnetizing" to "remagnetizing"
Col. 3, lines 60-61 - change "demagnetization" to "remagnetization"
Col. 3, line 62 - change "demagnetizing" to "remagnetizing"
Col. 3, lines 67-68 - change "demagnetizers" to "remagnetizers"
Col. 3, line 68 - change "demagnetize" to "remagnetize"
Col. 4, line 4 - change "demagnetized" to "remagnetized"
Col. 4, line 35 - change "demagnetizer" to "remagnetizer"
Col. 4, line 40 - change "demagnetizing" to "remagnetizing"
Col. 4, line 47 - change "demagnetizer" to "remagnetizer"
Col. 4, line 54 - change "demagnetizer" to "remagnetizer"
Col. 5, line 26 - change "demagnetization" to "remagnetization"
```

UNITED STATES PATENT AND TRADEMARK OFFICE
CERTIFICATE OF CORRECTION

PATENT NO. : 4,734,643

DATED : March 29, 1988

INVENTOR(S) : David M. Bubenick et al

It is certified that error appears in the above-identified patent and that said Letters Patent is hereby corrected as shown below:

Col. 6, line 18 - change the word "product" to "produce"

Signed and Sealed this

Ninth Day of August, 1988

*Attest:*

DONALD J. QUIGG

*Attesting Officer*     *Commissioner of Patents and Trademarks*